Dec. 14, 1954  C. W. JUNGE ET AL  2,696,807
DUAL FUEL ENGINE
Filed Nov. 15, 1950  5 Sheets-Sheet 3
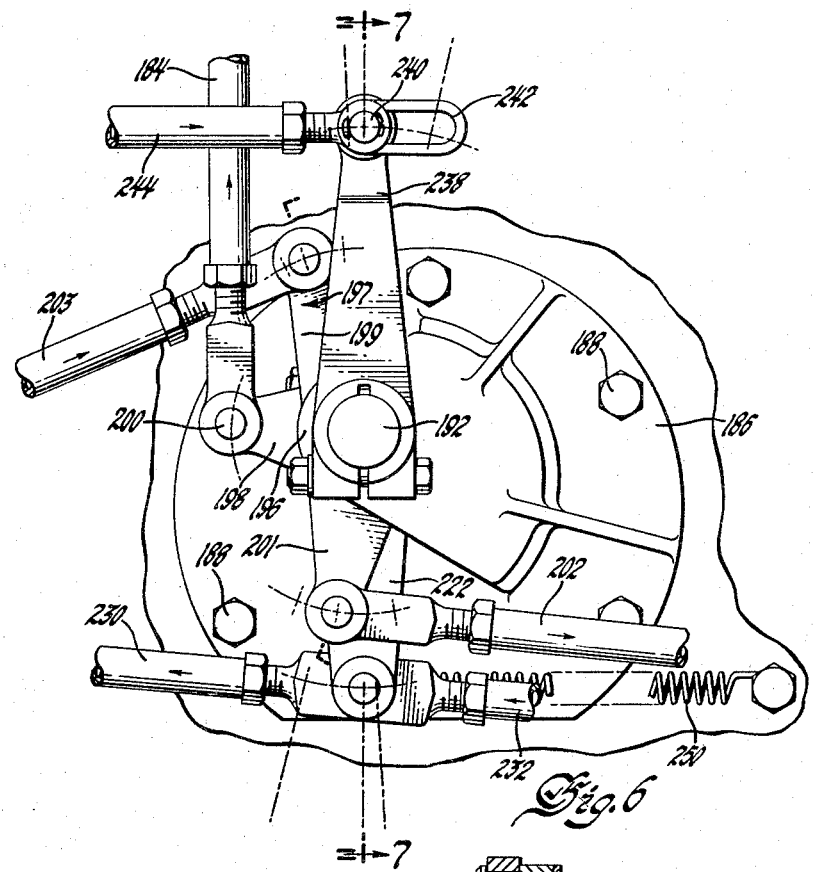
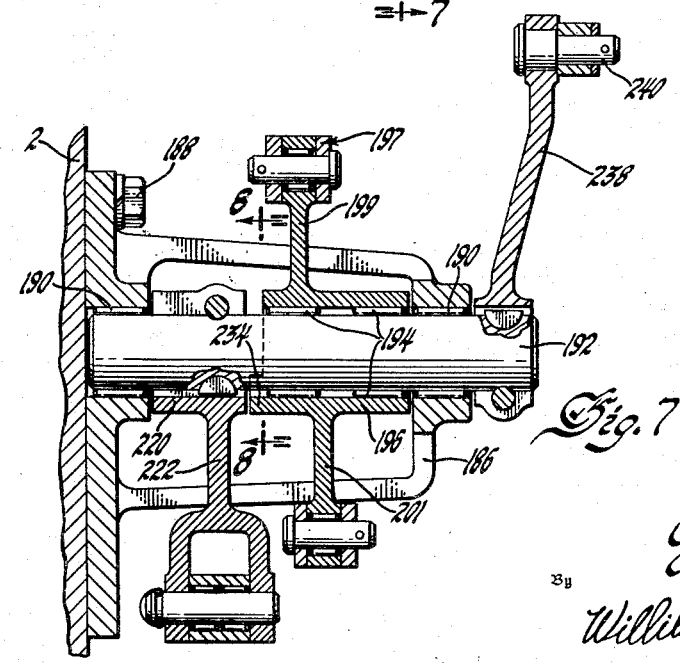
Inventors
Clarence W. Junge &
Carl C. Bierlein
By Willits, Helwig & Baillio
Attorneys

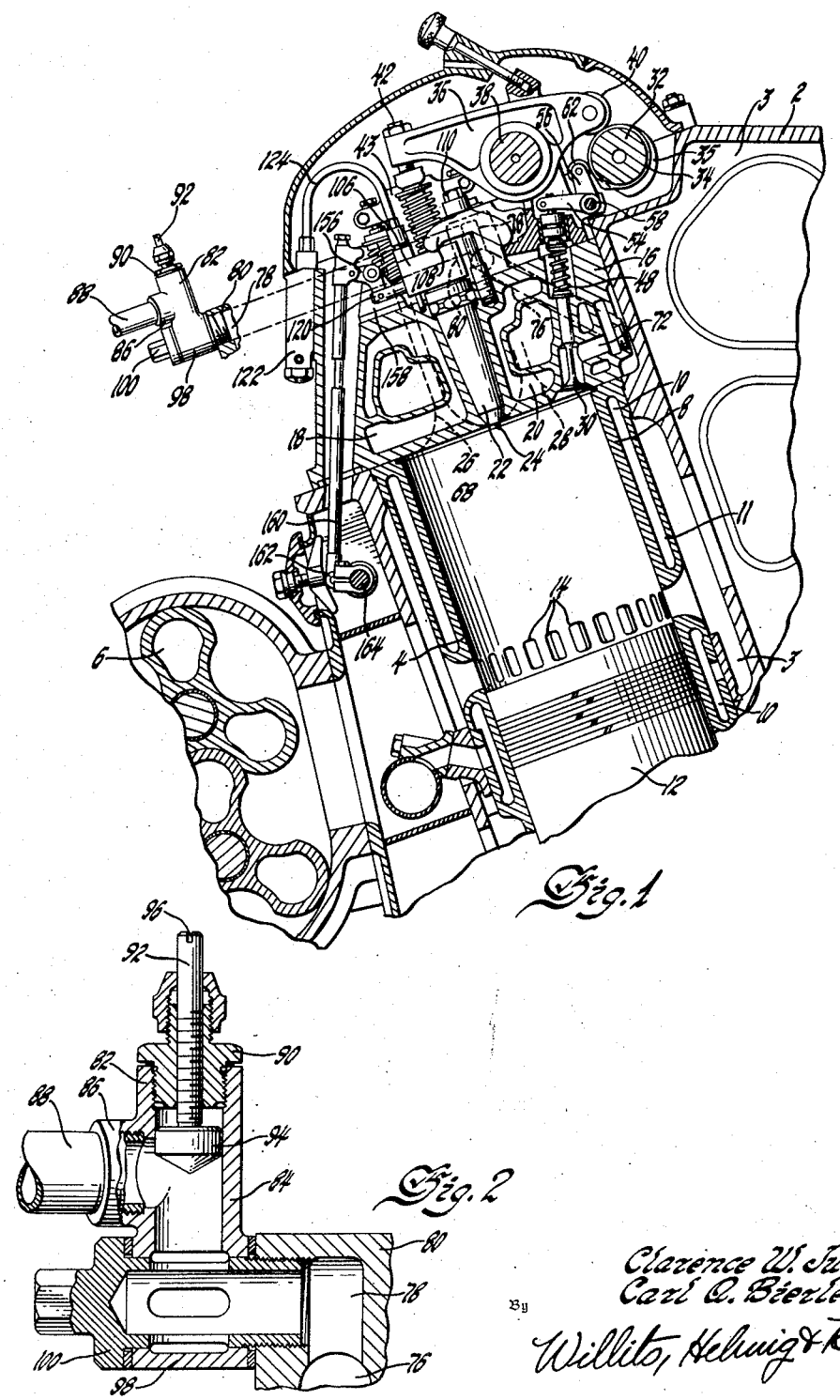

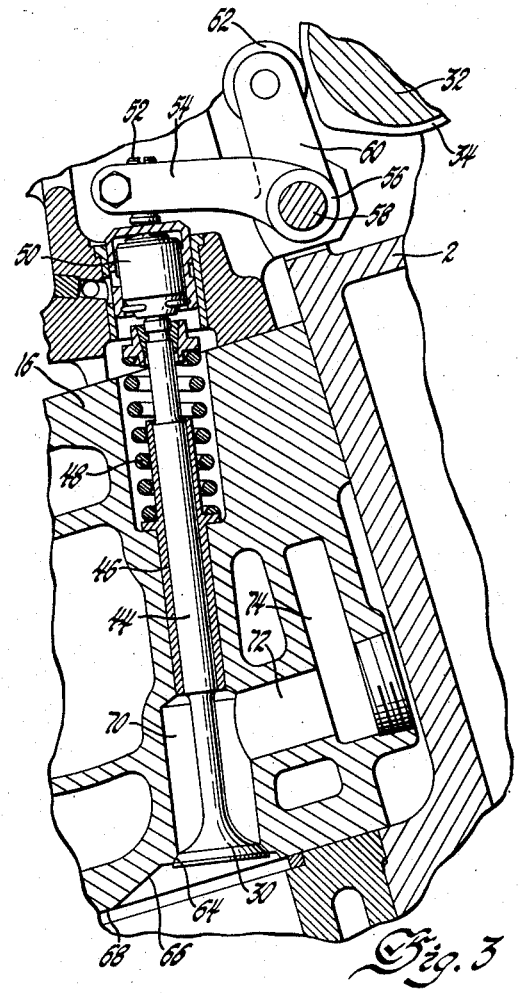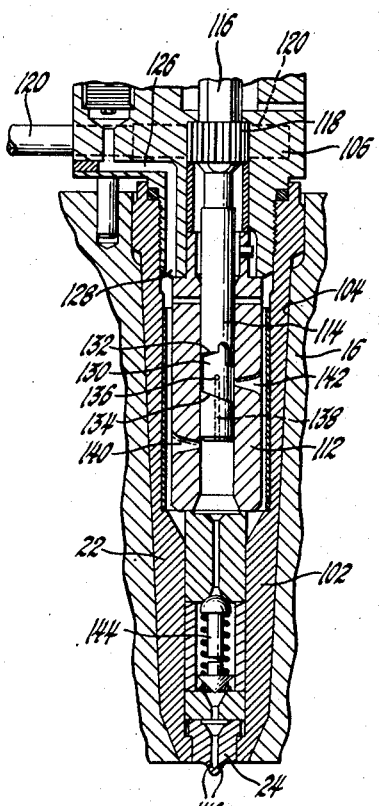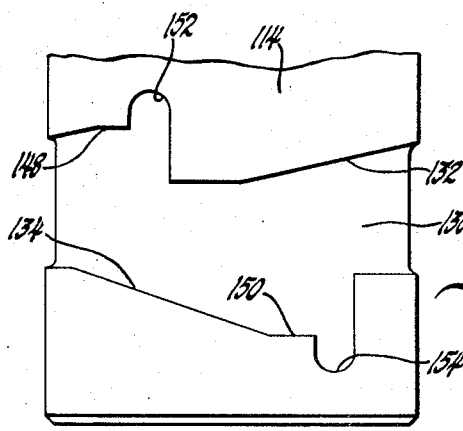

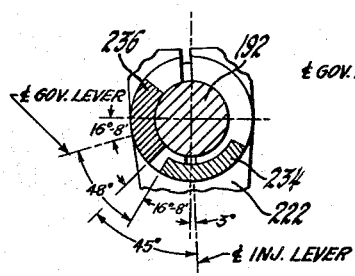
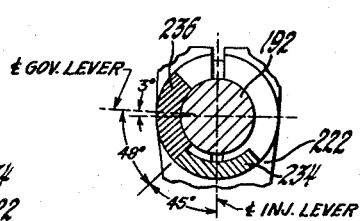
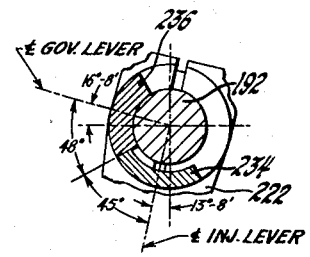
Fig. 8  Fig. 9  Fig. 10
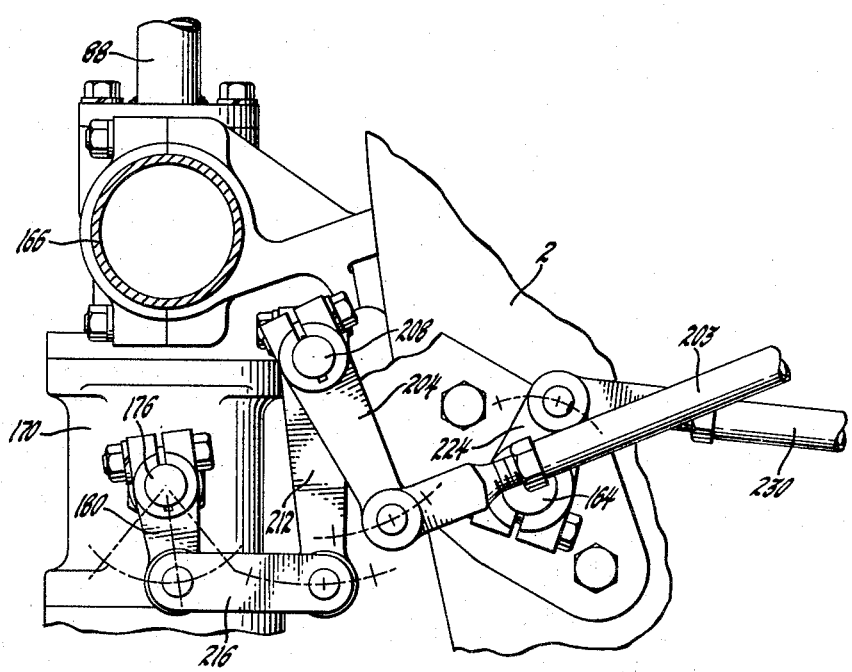
Fig. 11

Dec. 14, 1954     C. W. JUNGE ET AL     2,696,807
DUAL FUEL ENGINE
Filed Nov. 15, 1950     5 Sheets-Sheet 5
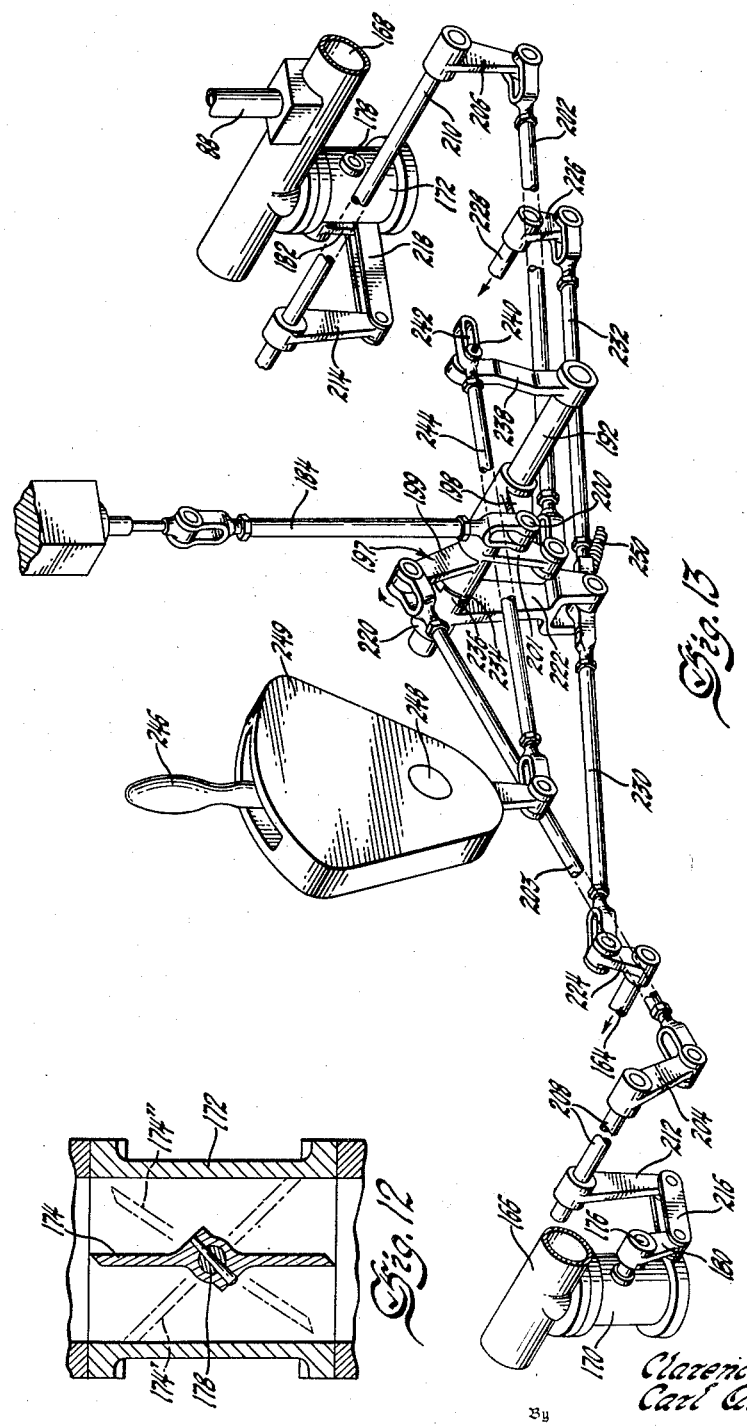
Inventors
Clarence W. Junge &
Carl C. Bierlein
By Willits, Helwig & Baillio
Attorneys

United States Patent Office 2,696,807
Patented Dec. 14, 1954

2,696,807

DUAL FUEL ENGINE

Clarence W. Junge and Carl A. Bierlein, Cleveland, Ohio, assignors to General Motors Corporation, Detroit, Mich., a corporation of Delaware Application November 15, 1950, Serial No. 195,856

7 Claims. (Cl. 123—27)

The invention relates to internal combustion engines of the compression ignition reciprocating type, and particularly to such engines designed to operate either on oil fuel injection exclusively or on a combination of oil and gas fuels.

Dual fuel engines of the aforementioned type have great utility in certain installations such as sewerage disposal plants and oil well drilling jobs where they can make use of low cost gas when such gas is available and can alternatively be run on oil fuel. It is generally required that the engine operate at constant speed and load notwithstanding fluctuations or termination of the gas supply. Further, the operation of such dual fuel engines on gas has been found to produce best results when the gas charge is accompanied by the smallest charge ("pilot injection") of fuel oil which will properly ignite the gas/air mixture.

Among the objects of the present invention are to provide improvements in such dual fuel engines with respect to the means for delivering gas to the combustion chamber, the means for regulating the gas delivery in response to engine power demands, and the means for controlling oil fuel injection in accordance with availability of the gas supply to meet the engine power demands.

Another object is to provide an improved two-cycle dual fuel engine having means for supplying air to an engine cylinder at a rate independent of the proportions of the gas and oil fuels being consumed, means for injecting oil fuel into the cylinder, means for delivering gas fuel to the cylinder unmixed with the air, and engine speed governor actuated means for regulating both the gas fuel delivery and the oil fuel injection rates in accordance with the availability of the gas fuel and the engine power demands.

The invention is shown by way of illustration in the accompanying drawings, in which:

Figure 1 is a transverse sectional view through one cylinder of a dual fuel engine constructed in accordance with this invention.

Figure 2 is an enlarged detail section similar to Figure 1 showing one of the manually operated valves for equalizing gas delivery pressures to the engine cylinders.

Figure 3 is an enlarged detail section similar to Figure 1 showing the gas inlet valve in the cylinder head and the cam driven operating means for this valve.

Figure 4 is an enlarged detail section view similar to Figure 1 showing the oil fuel injector pump.

Figure 5 is an enlarged diagrammatic view showing a development of the injector plunger.

Figure 6 is a fragmentary elevational view of one end of the engine showing the linkage connecting the engine speed governor to the fuel injector and gas throttle valve control rods.

Figure 7 is a sectional view taken substantially on line 7—7 of Figure 6.

Figure 8 is a detail sectional view taken on line 8—8 of Figure 7 showing the relative positions of the governor driven lever and injector control rod driving lever when the gas supply valve is closed and the injector is in "off" position.

Figure 9 is a view similar to Figure 8 but showing the positions of the respective levers when the gas valve is at full open position and the injector is set for pilot oil delivery.

Figure 10 is a view similar to Figure 8 but showing the relative positions of the respective levers when the gas valve has moved beyond full opening to substantially off position, and the injector is set for full oil delivery.

Figure 11 is a fragmentary elevational view of the same end of the engine of Figure 6 showing one of the gas manifolds in transverse section, the gas main supplying that manifold, and the linkage connecting the injector and gas throttle control rods to the injector control and throttle valve shafts.

Figure 12 is a detail sectional view of one of the gas manifold supply mains showing the gas throttle valve therein.

Figure 13 is a schematic view in perspective showing the layout of the linkage interconnecting the governor driven member, manual control lever, injector control shafts and gas throttle valves.

Referring now to the drawings in detail, Figure 1 is shown a portion of an internal combustion engine having a frame 2 forming an air box 3 about the cylinder 4 and supplied with air under pressure by a conventional Roots-blower 6. The cylinder 4 is in the form of a cylinder liner 8 supported within the frame 2 and having side walls with cored cooling water passages 10 and 11. The engine piston 12 is shown at the bottom of its reciprocatory stroke where it exposes a plurality of circumferentially spaced air inlet ports 14 provided in the cylinder liner wall for direct communication with the air box. Closing the upper end of the cylinder liner is the cylinder head 16 which is also provided with cooling water passages 18 and 20. Mounted in the cylinder head coaxially of the cylinder 4 is a fuel injector pump 22 terminating in a nozzle tip 24 centrally of and projecting into the upper end of the cylinder. Slidably mounted in the cylinder head and in radially spaced relation about the injector pump 22 are four poppet type exhaust valves arranged in pairs, with those of each pair being spaced from each other transversely of the engine as indicated in dotted lines at 26 and 28. Also mounted in the cylinder head adjacent the side of the cylinder between the two innermost exhaust valves 26 of each pair is a gas inlet valve 30. A camshaft 32 driven by the engine carries a cam 34, which serves to operate the inlet gas valve 30, an additional cam 35 to operate the injector pump, and two additional cams (not shown) angularly displaced with reference to cam 34 for operating the respective pairs of exhaust valves. A rocker 36 journaled by the shaft 38 carries a roller 40 at one end engaging the cam 34 and an adjusting screw 42 at its other end bearing upon the upper end of the injector pump plunger. Each pair of exhaust valves 26 and 28 has a bridge member 43 engaging their upper ends. A pair of rockers (not shown), similar to and journaled on opposite sides of the rocker 36 by the shaft 38, effect reciprocal movements of the bridge members to operate the exhaust valves.

Referring to Figure 3, it will be seen that the inlet valve 30 is of conventional poppet type, having a stem 44 slidably guided in a bushing 46 fixed in the cylinder head 16 and biased toward valve closing position by a helical compression spring 48. The upper end of the stem 44 abuts a hydraulic lash adjuster 50 which in turn engages an adjusting screw 52 carried by one arm 54 of a double-armed bell crank 56. This bell crank is journaled by a shaft suitably mounted in the rocker shaft mounting bracket which, in turn, is mounted on the cylinder head and its other arm 60 carries a roller 62 operating on cam 34.

The valve 30 controls the opening and closing of a port 64 in a recess 66 formed in the under side 68 of the cylinder head 16. For conducting gas to the port 64 the cylinder head is provided with a series of communicating cored passages 70, 72, 74, 76 and 78, of which 76 and 78 are indicated by broken lines in Figure 1. Passage 78 and its connecting end of passage 76 are in an upward extension 80 of the cylinder head to which is attached a manually adjusted gas pressure regulator 82 (shown to the left of its true position in Figure 1 for clarity of illustration).

As shown in Figure 2, this gas pressure regulator 82 comprises an elongated housing 84 having a side port 86 connected to a gas inlet pipe 88. One end of the housing is closed by a plug 90. Extending through and in threaded interengagement with the plug is an adjusting screw 92 carrying a valve 94 slidably fitting the interior of the housing. Suitable means such as the screw driver slot 96 is provided on the outer end of the screw for effecting its axial movement inwardly and outwardly of the housing to position the valve 94 into greater or less obstruction of the port 86. Adjacent its bottom end 98 the housing is clamped to one side of the cylinder head extension 80 by a French coupling 100 which conducts the gas to the cored passage 78.

As shown in Figure 4, the injector pump 22 is of the reciprocating plunger type, comprising a stationary body 102 seated in a well 104 in the cylinder head 16. The upper end of this body is threaded to a fitting 106 which is held down on the cylinder head by a crab 108 and stud 110 (Figure 1). Slidably reciprocal in the fitting 106 and operating as a piston in a stationary sleeve 112 within the body is the pump plunger 114, the upper end of which is provided with an integral shank portion 116 slidably splined to a pinion gear 118 meshing with a longitudinally shiftable rack 120 by which the plunger may be axially rotated during its reciprocation. Upper and lower ports 142 and 140 are provided in diametrically opposite walls of this sleeve, as shown. Oil fuel from a manifold (not shown) is passed through a filter 122 (Figure 1) mounted on the side of the cylinder head from which it flows through a feed pipe 124 to the fitting 106, and thence through connecting cored passages 126 and 128 in this fitting to the interior of the body 102 about the sleeve 112. The periphery of the portion of plunger 114 within the sleeve 112 has an annular groove 130 whose upper and lower sides are indicated generally by numerals 132 and 134 respectively. In addition, small connecting, radially and longitudinally, drilled passages 136 and 138 are provided in the plunger for communication between the groove 130 and the interior of the sleeve below the plunger. When the plunger is at the upper end of its stroke as in Figure 4, the oil fuel flows into the sleeve through its lower port 140. During the downward stroke of the plunger its lower end first closes off this port 140 and the oil below the plunger is forced through the passages 136 and 138 into the groove 130 from whence it escapes through the sleeve upper port 142 and returns through passages (not shown) to the engine oil fuel tank. When the plunger has moved downward sufficiently for the groove upper side 132 to pass below the upper port, further relieving of the oil pressure below the plunger through the passages 136 and 138 stops, and sufficient pressure then builds up below the plunger to move the check valve 144 off its seat and permit the oil to pass out through the nozzle openings 146 in the injector tip 24 and into the combustion chamber. With continued downward movement of the plunger the lower side 134 of the groove 130 uncovers the lower port 140, again allowing the oil under the plunger to pass up through the drilled passages 136 and 138, into the groove 130 and out of the sleeve 112 through the lower port 140. The sides 132 and 134 of the groove 130 are generally helical in shape and have reverse helix angles whereby the angular position of the plunger about its axis serves to control the quantity of oil injected during each cylinder operating cycle by controlling the length of downward travel of the plunger during which fuel is trapped below the plunger. When the plunger is rotated to the position in which the lowermost portion of the groove upper side 132 controls the closing of the upper port 142, the uppermost portion of the groove lower side 134 will control the opening of the lower port 140 for "full on" (maximum rate) oil fuel injection.

Since it is desired that the injector maintain a minimum "pilot" injection of oil fuel while the engine is operating on gas, the upper side 132 of the plunger groove is provided with a flat (zero helix angle) portion and the lower groove side 134 is provided with a similar flat portion. These portions are parallel. These flat portions (located in relationship with ports in the sleeve 112) are on diametrically opposite sides of the plunger and are each of sufficient length to fully control the closing and opening of the respective sleeve ports 142 and 140 within a range of axial rotation of the plunger, sufficiently wide to eliminate the cylinder-to-cylinder effects of normal maximum injector control linkage lost motion.

In Figure 5 is shown a diagrammatic development of the upper and lower sides 132 and 134 of the plunger groove 130. The flat portions referred to are shown at 148 on the groove upper side 132 and at 150 on the side 134. Immediately adjacent these flat portions the groove upper and lower sides are notched upwardly and downwardly as at 152 and 154 on diametrically opposite sides of the plunger. When the plunger is rotated to the "off" position the notch 152 maintains communication between the groove 130 and the sleeve upper port 142 during downward movement of the plunger until the notch 154 comes into registry with the lower port 140, whereby oil pressure below the plunger is vented and the check valve 144 remains seated throughout the pumping stroke, and no oil injection occurs. Suitable stop means (not shown) are provided for limiting axial rotation of the plunger between this "off" position and the "full on" position described above.

Referring again to Figure 1, the injector rack 120 is pivotally connected to one arm of a bell crank 156 which is suitably journaled in a bracket 158 on the cylinder head 16. The other arm of this bell crank is pivotally connected to the upper end of the injector control link 160 whose lower end, in turn, is pivotally connected to a lever 162 fixed on the injector control shaft 164 which is journaled for axial rotation in the engine frame 2.

While only one engine cylinder unit has been described it will be understood that the engine may incorporate additional cylinders having similar oil and gas fuel delivery means. The structure now to be described has reference to such an engine wherein a plurality of such cylinders are arranged in two banks extending longitudinally of the engine, with the bank including above described cylinder being identified for convenience as the "left" bank.

The gas inlet pipes 88 to each cylinder are supplied by left and right gas manifolds 166 and 168 (see Figures 11 and 13). These gas manifolds in turn are supplied with gas by right and left bank mains 170 and 172, in each of which is a throttle valve such as the butterfly or other suitable control valve 174 shown in Figure 12. The shafts 176 and 178 of these butterfly valves are journaled in the side walls of the mains and carry externally thereof cranks 180 and 182 by means of which the butterfly valves may be moved through the range from fully closed positions shown in broken lines at 174' in Figure 12, to the wide open position shown in full lines, and beyond this to the broken line position shown at 174" at which the gas flow through the main is restricted.

The engine is equipped with any suitable speed responsive governor (not shown), the details of which are not important to the present invention. Actuated by the governor is a control rod 184 (Figures 6 and 13). This rod is arranged to move longitudinally in an upward direction with increase in engine speed and in a downward direction with decrease in engine speed. In Figures 6 and 7 there is shown a bracket 186 which is bolted as at 188 to the frame 2 at one end of the engine. Journaled in bearings 190 in this bracket is a shaft 192 which in turn journals through bearings 194 the hub 196 of a three-armed bell crank 197. Forming one arm of this bell crank is a governor lever 198 which is pivotally connected at 200 at one end of the governor rod 184, and the other two arms 199 and 201 are connected respectively through links 203 and 202, cranks 204 and 206, jack shafts 208 and 210, cranks 212 and 214, and links 216 and 218 to the right and left bank throttle valve cranks 180 and 182 (see also Figures 11 and 13). It will be seen that upward movement of the governor rod 184 operates to move the butterfly valve in the main 172 in a clockwise direction, effecting first an opening of the valve and then a partial closing thereof after the valve overtravels its wide open position shown in full lines in Figure 12. It will be understood that the similar valve (not shown) on the valve shaft 176 in the left bank main 170 will have a similar opening movement followed by a closing movement as the shaft 176 turns in a counterclockwise direction with upward movement of the governor rod 184. When the engine is operating at maximum load and full rated speed with an ample supply of gas through the mains 170 and 172, each butterfly valve is in maximum open position as shown in full lines in Figure 12.

Axially adjacent the hub 196 and keyed to rotate with the shaft 192 as shown in Figure 7, is a hub 220 from which extends an injector lever 222. Pivotally interconnecting this lever, and cranks 224 and 226 fixed to the injector control shafts 164 and 228, are links 230 and 232. The adjacent ends of the hubs 196 and 220 are provided with interengageable teeth 234 and 236 accommodating a certain limited amount of rotary lost motion between the hubs. Also keyed to the shaft 192 is a crank 238 carrying a pin 240. This pin engages an elongated slot 242 in one end of a link 244 whose other end is connected to a hand lever 246 suitably pivoted at 248 in a quadrant 249. Biasing the crank 222 in a counterclockwise direction about the axis of shaft 192 is a tension spring 250. The pin 240 thus tends at all times to engage the left hand end of the slot 242, and hence the angular position of the injector lever 222 about the axis of shaft 192 depends on the angular position of the hand lever 246 about its pivot 248. The slot 242 has only sufficient length to accommodate rotation of the injector lever 222 through the range between pilot injection and "full on" settings of the injector plungers.

During dual fuel engine operation at rated speed the hand lever 246 is continuously held in a predetermined intermediate position in the quadrant 249 as shown in Figure 13, any suitable detent means being provided for this purpose. While gas of normal pressure and B. t. u. value is available in the mains 170 and 172, the governor rod 184 will hold the governor lever 198, and the spring 250 will hold the injector lever 222 in the positions indicated in Figure 9. The gas throttle valves are then in their wide open positions as shown in full lines for the right bank throttle valve 174 in Figure 12, and the injector plungers 114 are each set for "pilot injection" of oil fuel as previously described with reference to Figures 4 and 5.

Should either the supply pressure or heat value of the gas increase or the load on the engine decrease, resulting in an engine speed increase, the resultant downward movement of the governor rod 184 will move the governor lever 198 in a counterclockwise direction to effect a movement of the gas throttle valves toward their "off" positions. During this movement of the governor lever the injector lever remains stationary, the tooth 234 moving out of abutting engagement with the tooth 236. Resumption of normal conditions in the gas supply or engine loading will return the throttle valves to their wide open positions and the teeth 234 and 236 to abutting engagement.

In the event the gas pressure or heat value decrease, or the engine load increase, by an amount greater than will maintain the engine operating at its rated speed, with the throttle valves wide open, the governor rod 184 (in moving upward with the reduction in engine speed) will rotate the governor lever 198 in a clockwise direction from its position shown in Figure 9. This will cause the tooth 234 on the governor lever hub to rotatively pick up the tooth 236 on the injector lever hub and rotate the injector lever 222 also in a clockwise direction, in opposition to the spring 250, thereby rotating the injector plungers in directions tending to increase oil fuel delivery. Simultaneously with the increase in oil fuel injection the gas throttle valves will overtravel their wide open positions, this overtravel in the case of the throttle valve 174 in the left bank main being in the direction toward the broken line position 174" as shown in Figure 12. This movement of the linkage will continue in event of a complete failure of the gas supply until the governor lever 198 and the injector lever 222 reach the positions shown in Figure 10, at which the injectors operate at "full on" and the gas throttle valves are at their extreme overtraveled positions. It will be understood however, as shown in Figure 12, that in their extreme overtraveled positions the gas valves do not completely close off the mains. Upon a resumption of the gas supply sufficient gas will flow past the throttle valves in their overtraveled positions to cause the engine to increase in speed and the resultant downward movement of the governor rod 184 will start returning the governor lever 198 and the throttle valves to their normal dual fuel operating positions of Figure 9. This counterclockwise return movement of the governor lever will be followed up by counterclockwise movement of the injector lever 222 under the biasing action of the spring 250, the teeth 234 and 236 remaining in engagement.

To stop the engine, the hand lever is moved to the extreme right (clockwise about the pivot 248) in the quadrant 249, and held there. This causes the right hand end of the slot 242 to engage the pin 240 and move the injector lever counterclockwise to the injection "off" position. After the engine slows to a dead stop and the hand lever is released the governor rod 184 will move downward, in response to normal reaction force set up in the governor during stopping, causing the governor lever to rotate further counterclockwise a certain amount. Figure 8 shows the relative positions of the governor and injector levers with the engine stopped.

During cranking to start the engine, the hand lever 246 is moved to its extreme left hand position in the quadrant 249, thereby setting the injectors in their "full on" positions. After firing commences the hand lever is moved back to its predetermined intermediate position of Figure 13 for normal dual fuel operation.

Having described a specific structural embodiment of the invention and its manner of operation, what is claimed is:

1. In a dual fuel internal combustion engine, a cylinder having a cylinder head and a piston forming a combustion chamber, oil fuel injection means in the head including a nozzle directed into the combustion chamber and a reciprocable plunger for injecting oil fuel through said nozzle, said plunger being rotatable about its longitudinal axis during reciprocation to vary its effective pumping stroke, a lever controlling plunger rotation, means biasing said lever to a "pilot" fuel stroke setting of said plunger, piston controlled air intake ports in the wall of the cylinder, air supply means communicating with said air intake ports including a positive displacement blower whose operating speed varies directly with engine speed, a gas intake port in the cylinder head communicating with the combustion chamber, a reciprocably operated valve controlling said gas port, engine driven cams driving both said last named valve and said plunger, a gas supply conduit connected to said gas port, a throttle valve in said conduit, an engine speed responsive member arranged to move in one direction with increase in engine speed and in the opposite direction with decrease in engine speed, throttle valve controlling linkage directly responsive to movement of said member, and injector lever controlling linkage including a lost-motion connection to said member for increasing the effective pumping stroke of said plunger in response to increased engine power demands after said throttle valve has been first moved to its wide open position.

2. In a dual fuel engine, oil fuel regulating means including a fuel injection pump having a reciprocating and axially rotatable plunger, fuel inlet and escape ports controlled by the plunger, a groove on the surface of the plunger providing communication between said ports during a portion of the plunger stroke, said groove having portions of its opposite extremities longitudinally of the plunger in divergent relation and other circumferentially adjacent portions of said extremities in parallel relation perpendicular to the plunger longitudinal axis, and a gear for effecting axial rotation of the plunger to vary the period of time during each plunger stroke when said groove affords communication between said ports, an engine speed responsive linkage having an operative connection with said gear rotatively positioning the plunger with said parallel related groove portions in registry with said ports for pilot oil fuel injection and with said divergent related groove portions in registry with the ports when additional oil fuel injection is required to compensate for deficiencies in gas fuel.

3. In a dual fuel internal combustion engine, a cylinder having a cylinder head and a piston forming a combustion chamber, means including an engine mechanically driven positive displacement blower for admitting a uniform charge of combustion and scavenging air to the combustion chamber during each engine operating cycle irrespective of the proportions of gas and oil fuel being consumed by the engine, separate means for admitting gas to the combustion chamber including an engine reciprocated poppet valve in the cylinder head and a conduit for feeding gas thereto from a source of gas under pressure, a throttle valve movably supported in said conduit, said throttle valve being movable in either direction from its wide open position to restrict gas flow through the conduit, an engine driven oil fuel injection pump mounted in the cylinder head, said pump having an injection control rack and a nozzle through which oil fuel is injected into the combustion chamber, an injector lever controlling said rack, a rotatable shaft fixed to said injector lever, a throttle valve controlling lever journalled on said shaft axially adjacent said injector lever, means reacting against a fixed portion of the engine and biasing said injector lever toward reduced oil fuel injection, a stop engaged by the injector lever during pilot fuel injection, interengageable teeth on the adjacent ends of said lever providing a driving connection therebetween with sufficient lost motion to accommodate movement of the throttle lever independently of the injector lever through the range between full off and wide open positions of the throttle valve while said injector lever is engaged by said stop, a governor actuated member connected to said throttle control lever for regulating the delivery of gas to the engine during pilot fuel injection and the delivery of oil fuel during periods of gas deficiency.

4. In a dual fuel engine, engine air supply means having a fixed air delivery rate in relation to engine operating speed, means for supplying gas fuel to the engine from a source subject to varying delivery pressures including a gas conduit connecting said source to the engine, a throttle valve controlling gas flow through said conduit and movable in opposite directions toward closed position from an intermediate full open position, an engine speed responsive governor member linked to positively effect movements of the throttle valve from its full open position in response to engine speed changes from a predetermined speed, engine oil fuel supply means including an injector having a control member movable in opposite directions to increase and decrease injector delivery, a manually movable lever having a pin and slot connection with said injector control member limiting movement of the injector control member in the direction of decreasing fuel delivery when said pin is at one end of the slot and limiting movement of the injector control member in the direction of increasing fuel delivery when the pin is at the opposite end of the slot, resilient means reacting against a fixed portion of the engine and urging the injector control member in the direction of decreasing fuel delivery, and a member movable with said throttle valve and having a lost motion connection with said injector control member, said lost motion connection accommodating movements of the throttle valve independently of the injector control member in response to changes in engine speed above said predetermined speed but effective to cause concurrent movement of the injector control member in the increasing fuel delivery direction in opposition to said resilient means with movement of the throttle valve in response to decrease in engine speed below said predetermined speed.

5. In a dual fuel engine, engine air supply means having a fixed air delivery rate in relation to engine operating speed, means for supplying gas fuel to the engine from a source subject to varying delivery pressures including a gas conduit connecting said source to the engine, a throttle valve controlling gas flow through said conduit and movable in opposite directions toward closed position from an intermediate full open position, an engine speed responsive governor member linked to positively effect movements of the throttle valve from its full open position in response to engine speed changes from a predetermined speed, engine oil fuel supply means including an injector having a control member movable in opposite directions to increase and decrease injector delivery, a manually movable lever having a lost motion connection with said injector control member accommodating movement of the injector control member independently of the manually movable lever between positions corresponding to pilot fuel delivery and full fuel delivery, resilient means reacting against a fixed portion of the engine and urging the injector control member to its pilot fuel delivery position, and a member movable with said throttle valve and having a lost motion connection with said injector control member accommodating movements of the throttle valve independently of the injector control member in response to changes in engine speed above said predetermined speed but effective to cause concurrent movement of the injector control member toward its full fuel delivery position in opposition to said resilient means upon a decrease in engine speed below said predetermined speed.

6. In a dual fuel engine, engine air supply means having a fixed air delivery rate in relation to engine operating speed, means for supplying gas fuel to the engine from a source subject to varying delivery pressures including a gas conduit connecting said source to the engine, a throttle valve controlling gas flow through said conduit and movable in opposite directions toward closed position from an intermediate full open position, an engine speed responsive governor member linked to positively effect movements of the throttle valve from its full open position in response to engine speed changes from a predetermined speed, engine oil fuel supply means including an injector having a control member movable in opposite directions to increase and decrease injector delivery, a manual control lever movable in opposite directions from an intermediate position, said injector control member having a first lost motion connection with said manual control member and a second lost motion connection with said throttle valve, the lost motion provided in said first connection limiting movement of the injector control member between pilot and full fuel delivery when said manual control lever is in its intermediate position, said second lost motion connection accommodating movement of the throttle valve independently of the injector control member in response to engine speed changes above said predetermined speed but effective to cause concurrent movement of the injector control member in the direction of increasing fuel delivery in response to decrease in engine speed below said predetermined speed, and resilient means reacting against a fixed portion of the engine and urging the injector control member in the direction of decreasing fuel delivery.

7. In a dual fuel internal combustion engine, a cylinder having a cylinder head and a piston forming a combustion chamber, piston controlled air intake ports in the cylinder, an engine mechanically driven positive displacement blower supplying air to said air intake ports, a gas intake port in the cylinder head, a gas supply conduit connected to said gas intake port, a throttle valve in said conduit, a lever controlling said throttle valve, an oil fuel nozzle in said cylinder head having communication with the cylinder, an engine driven pump delivering oil fuel through said nozzle, said pump having means including a lever for regulating the pump delivery rate, yieldable means normally holding said pump regulating lever in position for pilot oil fuel delivery, means responsive to increasing engine power demands for first moving said throttle valve lever to wide open throttle position and thereafter moving said pump regulating lever to increase pump oil fuel delivery.

References Cited in the file of this patent

UNITED STATES PATENTS

| Number | Name | Date |
|---|---|---|
| 1,962,283 | Nordberg | June 12, 1934 |
| 2,306,364 | Skaredoff | Dec. 22, 1942 |
| 2,400,219 | Barnaby et al. | May 14, 1946 |
| 2,400,247 | Miller et al. | May 14, 1946 |
| 2,454,222 | Shepherd | Nov. 16, 1948 |
| 2,509,960 | Calhoun | May 30, 1950 |
| 2,587,376 | Pelly et al. | Feb. 26, 1952 |